(12) United States Patent
Fan (10) Patent No.: US 8,278,551 B2
(45) Date of Patent: Oct. 2, 2012

(54) ELECTRONIC DEVICE

(75) Inventor: Chin-Lung Fan, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 265 days.

(21) Appl. No.: 12/723,508

(22) Filed: Mar. 12, 2010

(65) Prior Publication Data

US 2011/0042118 A1  Feb. 24, 2011

(30) Foreign Application Priority Data

Aug. 24, 2009  (TW) ................................. 98128344 A (51) Int. Cl.
*H05K 5/00* (2006.01)
(52) U.S. Cl. ............. 174/50; 439/535; 248/906; 174/58
(58) Field of Classification Search ..................... 174/50, 174/58; 439/535; 220/4.02; 248/906
See application file for complete search history.

(56) References Cited

U.S. PATENT DOCUMENTS

| 7,888,595 | B2 * | 2/2011 | Guttinger | 174/50 |
| 7,989,696 | B2 * | 8/2011 | Shi et al. | 174/50 |

FOREIGN PATENT DOCUMENTS

| CN | 201096168 Y | 8/2008 |
| TW | M335773 | 7/2008 |

OTHER PUBLICATIONS

China Patent Office, Office Action, Patent Application Serial No. 200910169657.X, Oct. 8, 2011, China.
Taiwan Patent Office, Office Action, Patent Application Serial No. 098128344, Jun. 28, 2012, Taiwan.

\* cited by examiner

*Primary Examiner* — Dhirubhai R Patel (57) ABSTRACT

An electronic device is provided. The electronic device includes a housing, an elastic pad unit and an elastic element. An opening is formed on the housing. The elastic pad unit includes a pad and a pillar. The pillar has a first end and a second end, wherein the first end is connected to the pad, the pillar extends through the housing via the opening, a restricting portion is formed on the second end, and the restricting portion is located in the housing. The elastic element is disposed between the pad and the housing, wherein the pad moves between a first position and a second position relative to the housing, the restricting portion contacts a first part of the housing when the pad is in the first position, and the restricting portion is separated from the first part when the pad is in the second position.

14 Claims, 8 Drawing Sheets

ELECTRONIC DEVICE

CROSS REFERENCE TO RELATED APPLICATIONS

This Application claims priority of Taiwan Patent Application No. 98128344, filed on Aug. 24, 2009, the entirety of which is incorporated by reference herein.

BACKGROUND OF THE INVENTION

1. Field of the Invention

The present invention relates to an electronic device, and in particular relates to an electronic device which can sufficiently contact a supporting surface.

2. Description of the Related Art

Figure 1A:
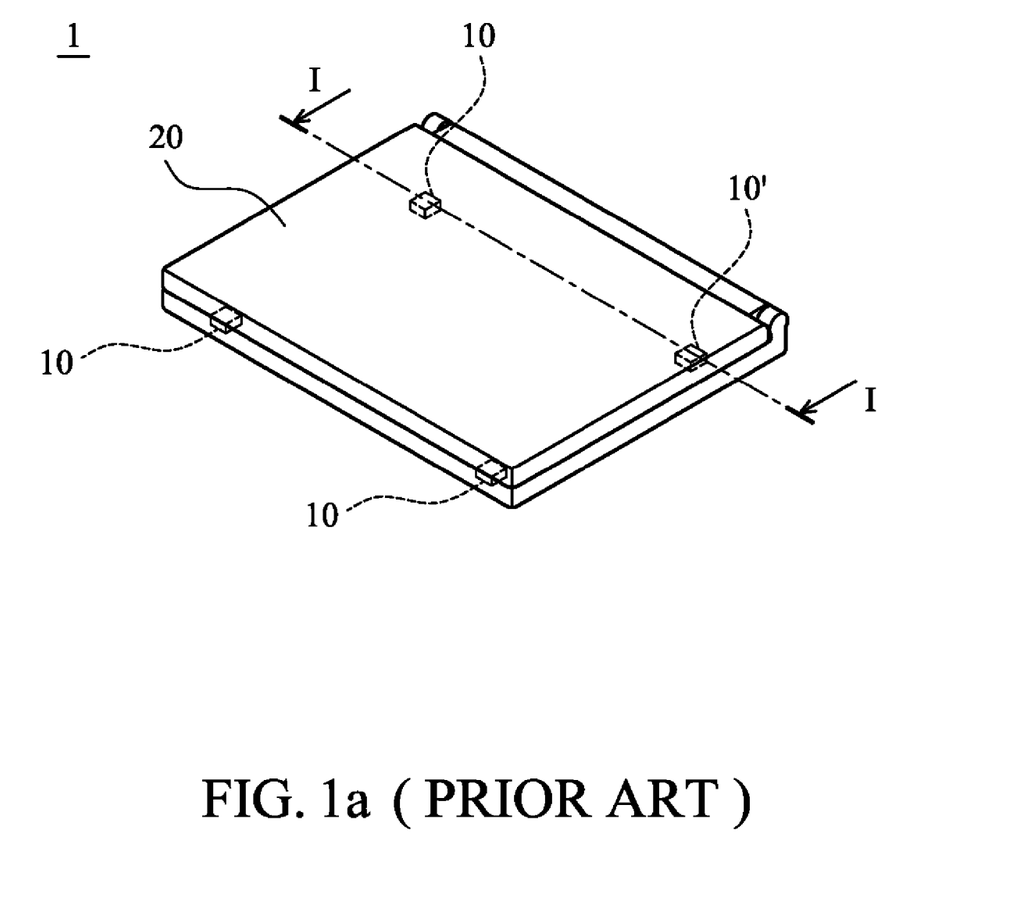
FIG. 1a shows a conventional electronic device.
Figure 1B:
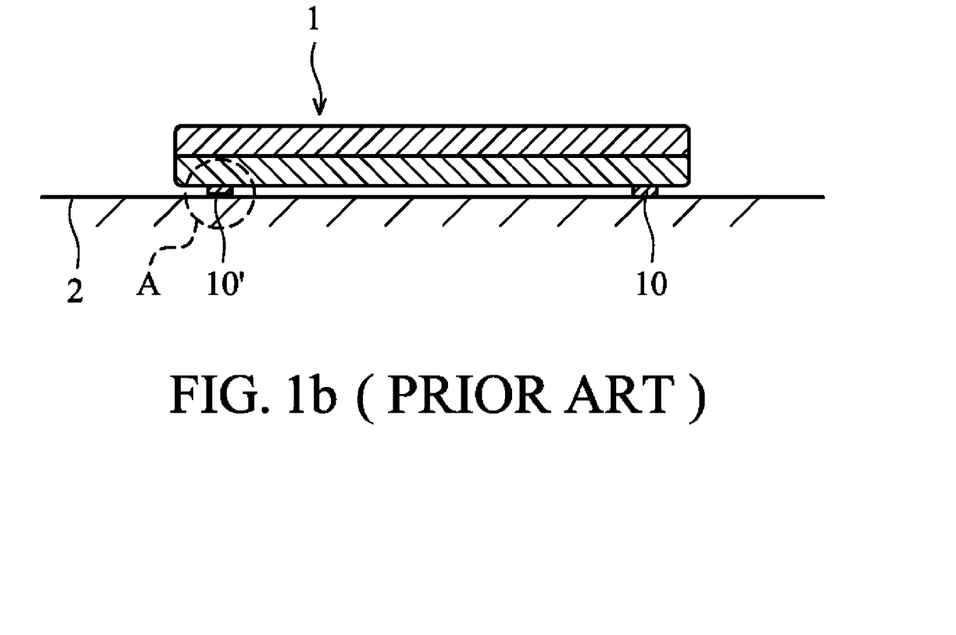
Figure 1C:
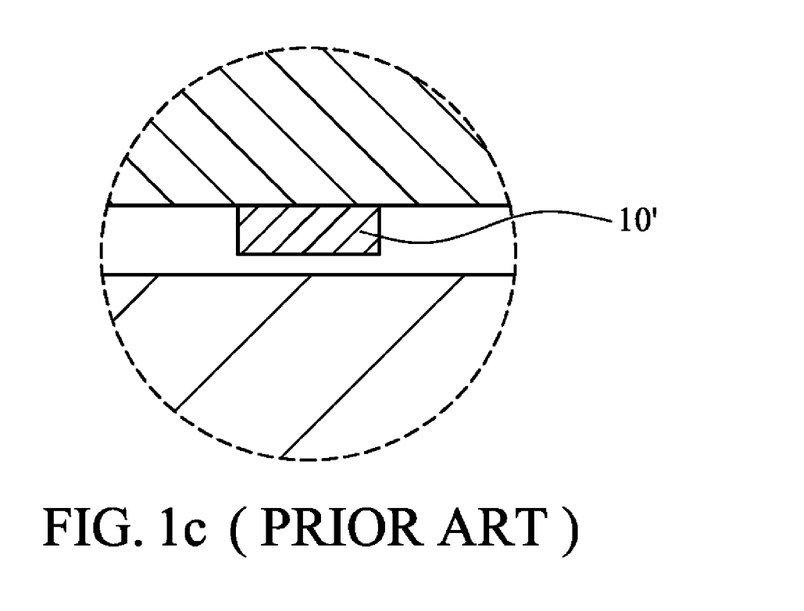
FIG. 1c is an enlarged view of portion A of FIG. 1b.

FIG. 1a shows a conventional electronic device 1, comprising a housing 20 and pad units 10 and 10'. FIG. 1b is a sectional view along direction I-I of FIG. 1a. FIG. 1c is an enlarged view of portion A of FIG. 1b. Conventionally, due to flexing of the conventional electronic device 1 during the manufacturing process, the housing 20 may deform, wherein a bottom surface thereof twists. Additionally, pad units may be assembled to the housing 20 with different heights protruding from the bottom surface. Therefore, with reference to FIG. 1b and 1c, the pad unit 10' may not sufficiently contact a supporting surface 2 (for example, table surface).

BRIEF SUMMARY OF THE INVENTION

A detailed description is given in the following embodiments with reference to the accompanying drawings.

An electronic device is provided. The electronic device includes a housing, an elastic pad unit and an elastic element. An opening is formed on the housing. The elastic pad unit includes a pad and a pillar. The pillar has a first end and a second end, wherein the first end is connected to the pad, the pillar extends through the housing via the opening, a restricting portion is formed on the second end, and the restricting portion is located in the housing. The elastic element is disposed between the pad and the housing, wherein the pad moves between a first position and a second position relative to the housing, the restricting portion contacts a first part of the housing when the pad is in the first position, and the restricting portion is separated from the first part when the pad is in the second position.

Utilizing the electronic device of the embodiment of the invention, the pad of the elastic pad unit can be moved to compensate for deformation of the housing. Therefore, the pad of the elastic pad unit can sufficiently contact a supporting surface (table surface) thereof.

BRIEF DESCRIPTION OF THE DRAWINGS

The present invention can be more fully understood by reading the subsequent detailed description and examples with references made to the accompanying drawings, wherein:

FIG. 1b is a sectional view along direction I-I of FIG. 1a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
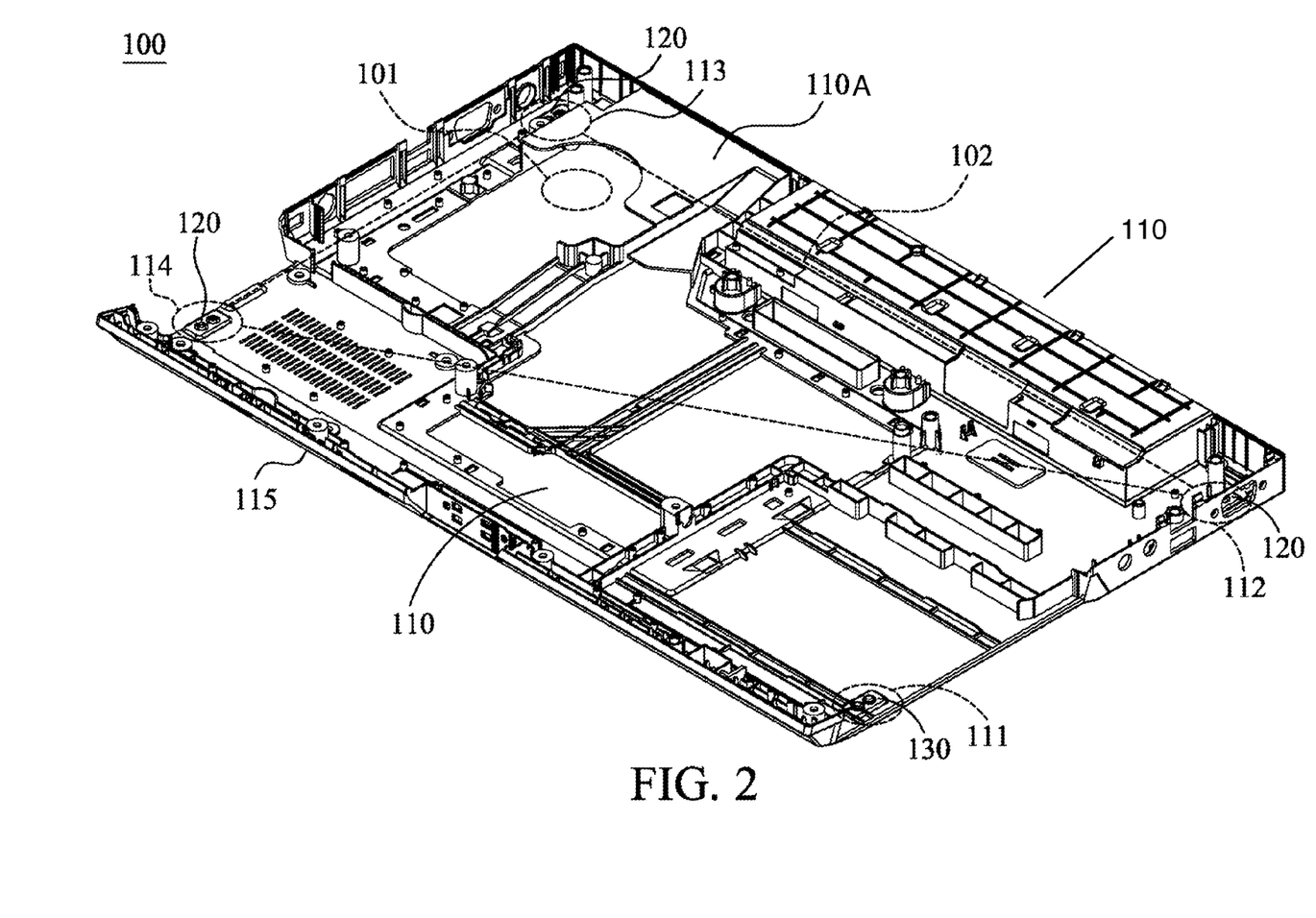
FIG. 2 shows an electronic device of an embodiment of the invention.

FIG. 2 shows an electronic device 100 of an embodiment of the invention, comprising a housing 110, three fixed pad units 120 and an elastic pad unit 130. The fixed pad units 120 define a triangular area 102. The electronic device 100 comprises a gravity center 101, and the gravity center 101 is located in the triangular area 102.

The housing 110 is rectangular. The housing 110 comprises a wall 110A having a first surface (bottom surface) 115 on an exterior side thereof and an opening 103 there through. The first surface 115 has a first corner 111, a second corner 112, a third corner 113 and a fourth corner 114. The elastic pad unit 130 is disposed on the first corner 111 of the first surface 115. The fixed pad units 120 are respectively disposed on the second corner 112, the third corner 113 and the fourth corner 114.

Figure 3:
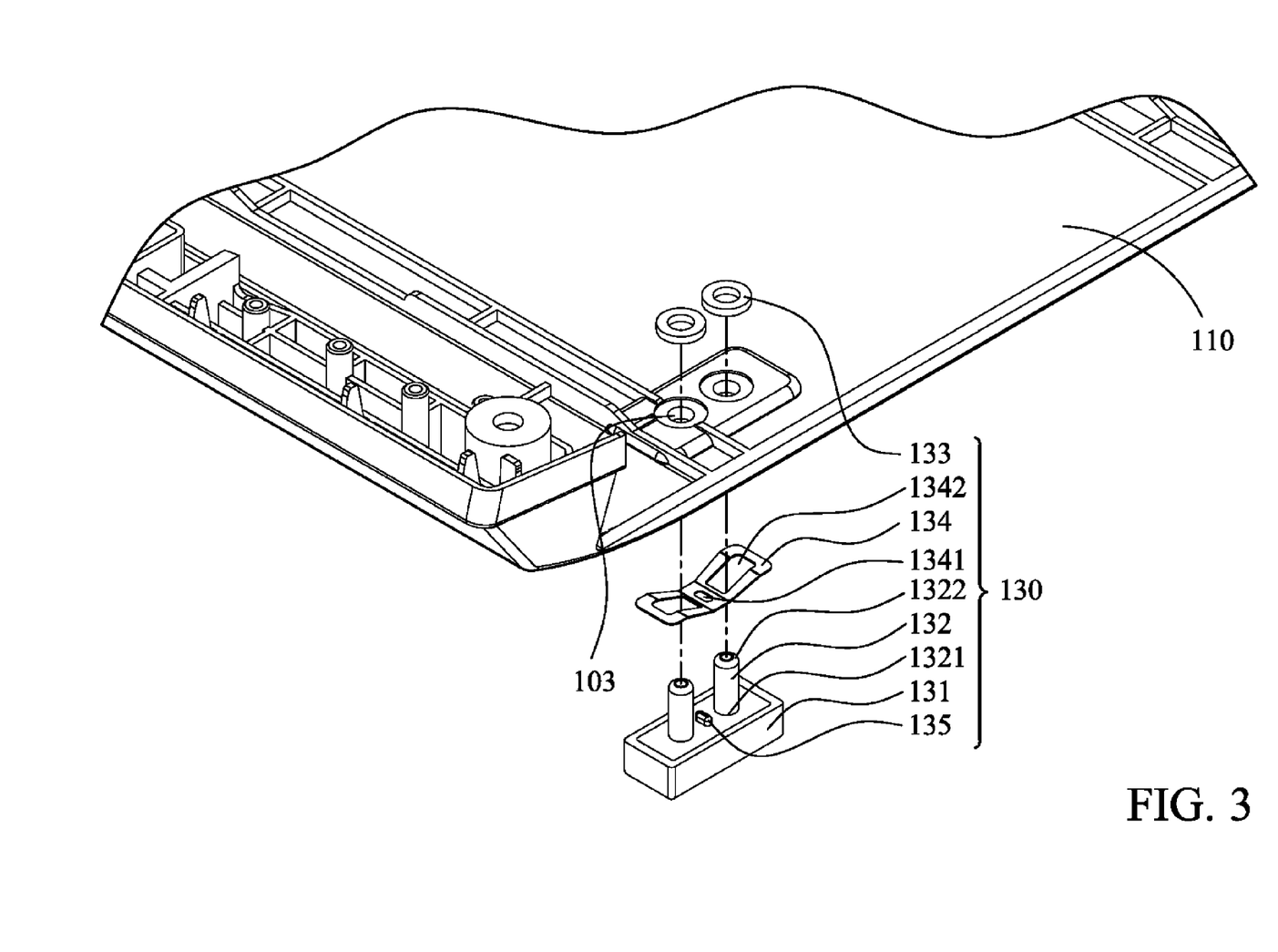
FIG. 3 is an exploded view of an elastic pad unit of the embodiment of the invention.

FIG. 3 is an exploded view of the elastic pad unit 130. The elastic pad unit 130 comprises a pad 131, pillars 132, restricting portions 133 and an elastic element 134. Each pillar 132 has a first end 1321 and a second end 1322. The first end 1321 is connected to the pad 131, and the second end 1322 enters the housing 110 through the opening 103. The restricting portions 133 are disposed on the second ends 1322. The elastic element 134 is disposed between the pad 131 and the housing 110.

The elastic element 134 is a bended elastic metal sheet. A fixing hole 1341 and through holes 1342 are formed on the elastic element 134. The restricting portions 133 are plates.

Figure 4A:
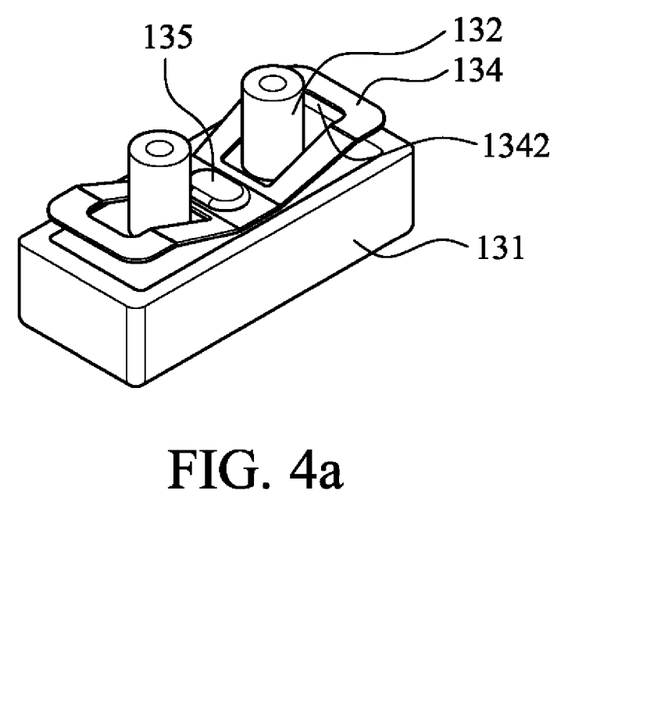
FIG. 4a shows a fusion protrusion fixing an elastic element of the embodiment of the invention.
Figure 4B:
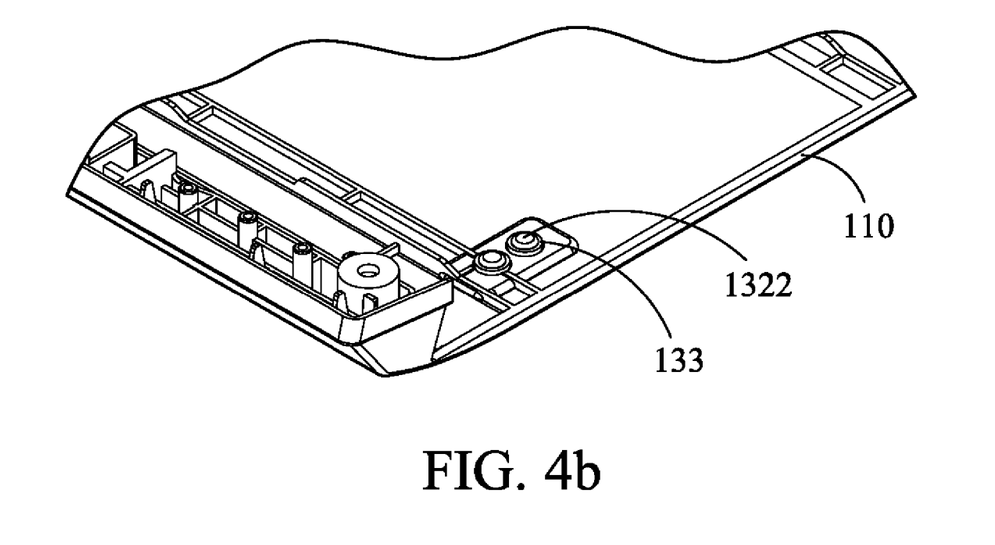
FIG. 4b shows second ends of pillars fusion connecting restricting portions of the embodiment of the invention.

A fusion protrusion 135 is formed on the pad 131. When the elastic pad unit 130 is assembled, with reference to FIG. 4a, the fusion protrusion 135 passes through the fixing hole 1341. A heat melting adhesive process is applied to the fusion protrusion 135 to fix the elastic element 134 on the pad 131. The pillars 132 pass through the through holes 1342. Then, with reference to FIG. 4b, the pillars 132 pass through the housing 110, and are connected to the restricting portions 133 with the second ends 1322 by heat melting adhesive. The restricting portions 133 restrict the position of the elastic pad unit 130 to prevent the elastic pad unit 130 from separating from the housing 110. In another embodiment, the restricting portions 133 are integrally formed on the second end 1322.

Figure 5A:
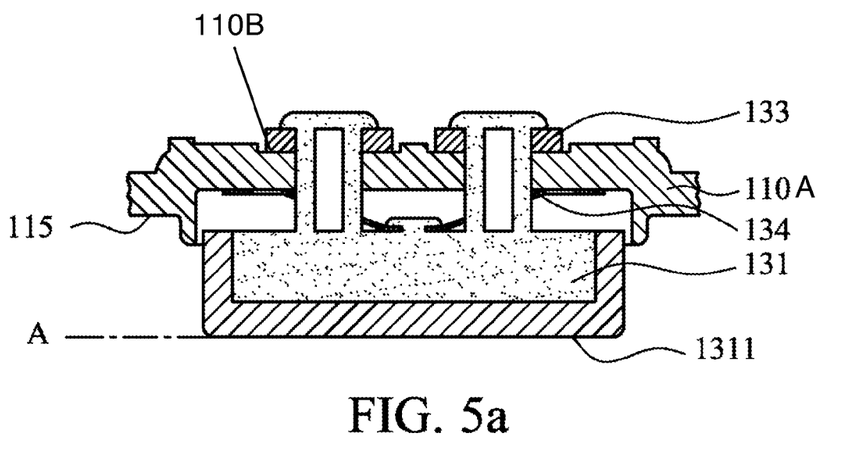
FIG. 5a shows a pad of the embodiment of the invention in a first position.
Figure 5B:
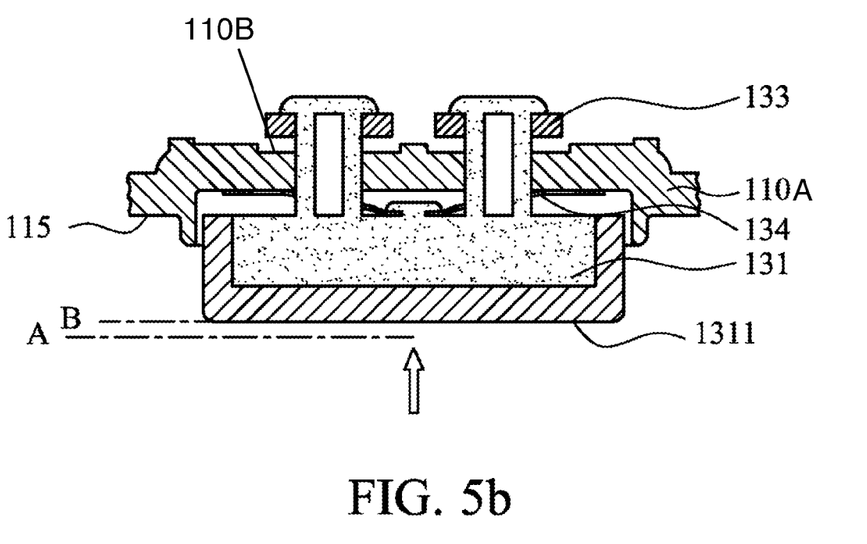
FIG. 5b shows the pad of the embodiment of the invention in a second position.

FIGS. 5a and 5b are sectional views of the elastic pad unit 130. The pad 131 is disposed on an exterior side of the wall 110A and moves between a first position A (as shown in FIG. 5a) and a second position B (as shown in FIG. 5b) relative to the housing 110. When the electronic device is not placed on a supporting surface (table surface), the pad 131 is located in the first position A, and the restricting portions 133 (which are disposed on an interior side of wall 110A) abut a first part 110B of the housing 110. When the electronic device is placed on the supporting surface, the pad 131 is in the second position B, and the elastic element 134 (which is disposed between the pad 131 and the wall 110A on the exterior side of the housing 110) applies an elastic force upon the pad 131.

When the pad 131 is in the first position A, a distance between a free end 1311 of the pad 131 and the first surface 115 is greater than a distance between a free end of one of the fixed pad units 120 and the first surface 115.

Figure 6:
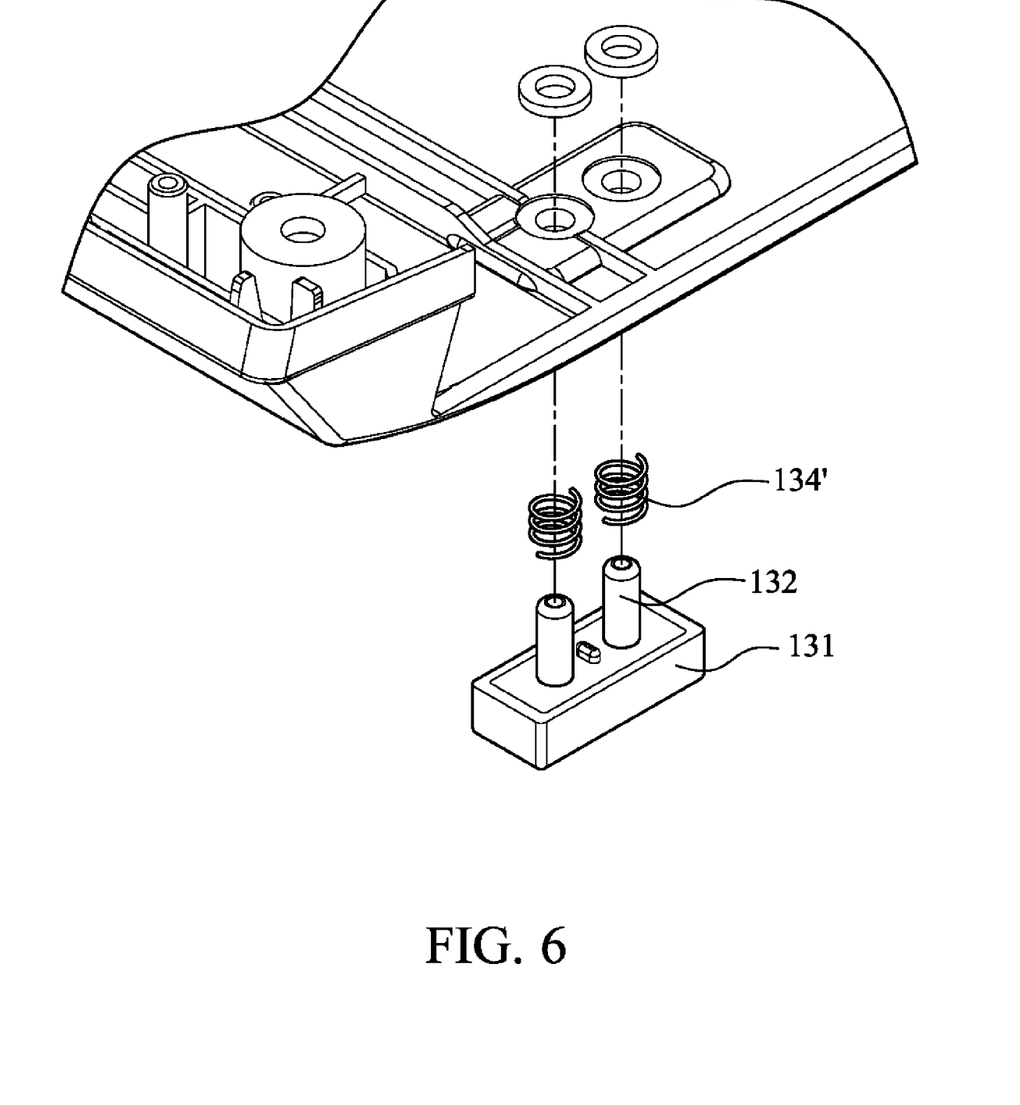
FIG. 6 shows a modified embodiment of the invention.
Figure 7:
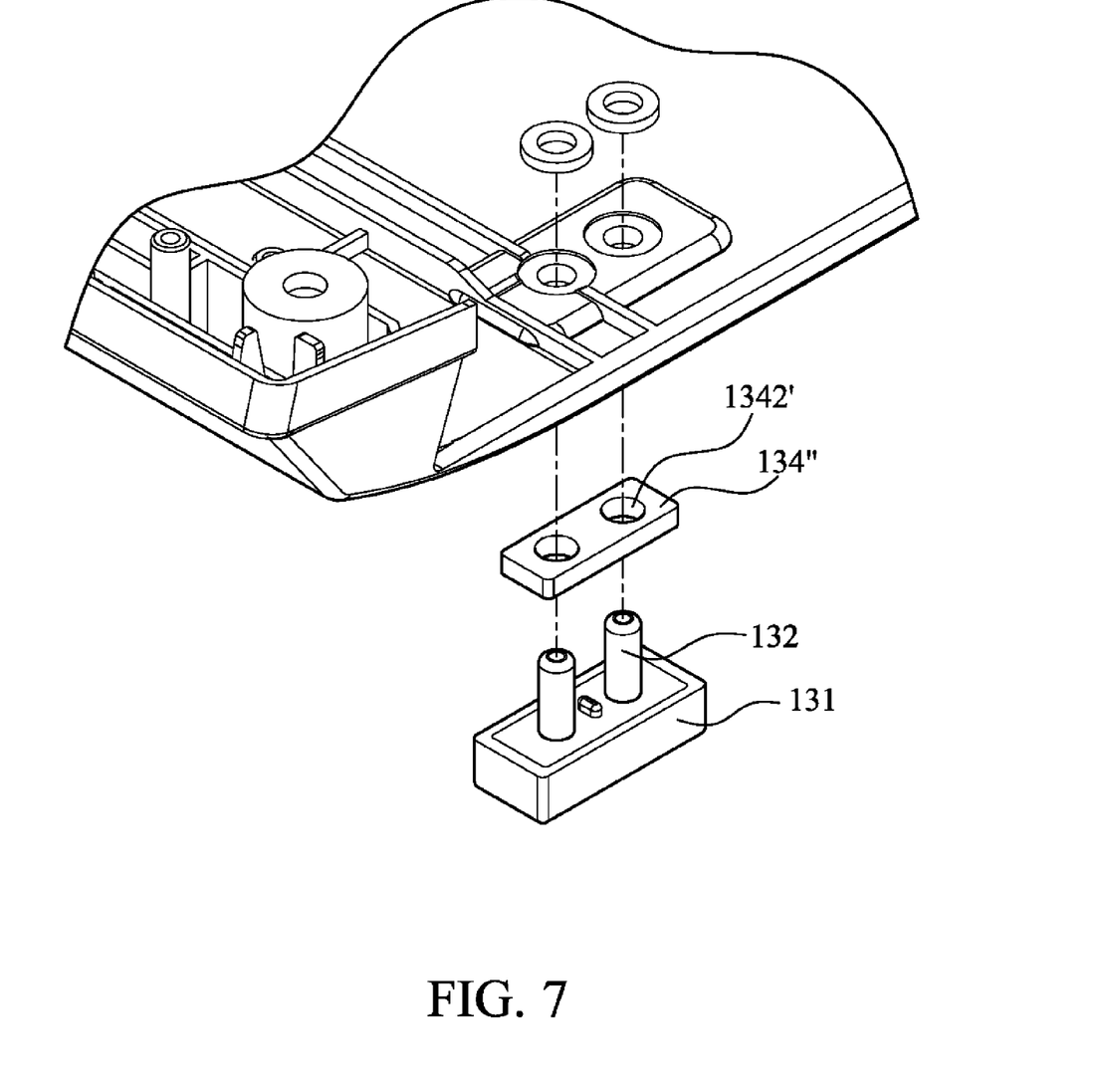
FIG. 7 shows another modified embodiment of the invention.

FIG. 6 shows a modified embodiment of the invention, wherein the elastic elements 134' are springs telescoped on the pillars 132. The elastic elements can be helical compression spring. FIG. 7 shows another modified embodiment of the invention, wherein the elastic element 134" is a memory sponge, through holes 1342' are formed on the elastic element 134", and the pillars 132 pass through the through holes 1342'.

Utilizing the electronic device of the embodiment of the invention, the pad of the elastic pad unit can be moved to compensate for deformation of the housing. Therefore, the pad of the elastic pad unit can sufficiently contact the supporting surface thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a housing, wherein an opening is formed through a wall of the housing;
   an elastic pad unit, comprising:
      a pad disposed on an exterior side of the wall of the housing;
      a pillar, having a first end and a second end, wherein the first end is connected to the pad, the pillar extends through the wall of the housing via the opening, a restricting portion is formed on the second end, and the restricting portion is located on an interior side of the wall of the housing; and
      an elastic element, disposed between the pad and the wall on the exterior side of the housing, wherein the pad is movable between a first position and a second position relative to the wall of the housing, the restricting portion contacts a first part of the housing when the pad is in the first position, the restricting portion is separated from the first part of the housing when the pad is in the second position, and the elastic element is compressed to apply an elastic force upon the pad when the pad is in the second position.

2. The electronic device as claimed in claim 1, wherein the restricting portion comprises a plate.

3. The electronic device as claimed in claim 1, wherein the restricting portion is fixed on the second end by heat melting adhesive.

4. The electronic device as claimed in claim 1, wherein the elastic element is fixed on the pad by heat melting adhesive.

5. The electronic device as claimed in claim 1, wherein the elastic element is a bended elastic sheet.

6. The electronic device as claimed in claim 5, wherein the elastic element has a hole, and the pillar passes through the hole.

7. The electronic device as claimed in claim 1, wherein the elastic element is a bended metal sheet.

8. The electronic device as claimed in claim 1, wherein the elastic element is a spring.

9. The electronic device as claimed in claim 8, wherein, wherein the spring is a helical compression spring.

10. The electronic device as claimed in claim 1, wherein the elastic element is a memory sponge.

11. The electronic device as claimed in claim 1, wherein the restricting portion is integrally formed on the second end.

12. The electronic device as claimed in claim 1, wherein the wall of the housing has a first surface, the first surface has a first corner, a second corner, a third corner and a fourth corner, and the elastic pad unit is disposed on the first corner of the first surface.

13. The electronic device as claimed in claim 12, further comprising at least two fixed pad units, disposed on the first surface of the housing.

14. The electronic device as claimed in claim 13, wherein when the pad is in the first position, a distance between a free end of the pad and the first surface is greater than a distance between a free end of the fixed pad unit and the first surface.

* * * * *